(12) United States Patent
Angel

(10) Patent No.: US 8,197,076 B2
(45) Date of Patent: Jun. 12, 2012

(54) MAGNETIC MEMBRANE MIRROR

(75) Inventor: Matthew M. Angel, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1330 days.

(21) Appl. No.: 11/679,254

(22) Filed: Feb. 27, 2007

(65) Prior Publication Data

US 2010/0027143 A1   Feb. 4, 2010

Related U.S. Application Data

(60) Provisional application No. 60/799,452, filed on May 11, 2006.

(51) Int. Cl.
*G02B 5/08* (2006.01)
(52) U.S. Cl. ..................................................... 359/846
(58) Field of Classification Search .............. 359/846, 359/847, 849
See application file for complete search history.

(56) References Cited

U.S. PATENT DOCUMENTS

| | | | |
|---|---|---|---|
| 4,046,462 A * | 9/1977 | Fletcher et al. ............... | 359/847 |
| 5,680,262 A | 10/1997 | Soliday et al. | |
| 6,113,242 A | 9/2000 | Marker et al. | |
| 6,332,687 B1 | 12/2001 | Carreras et al. | |
| 6,533,426 B2 | 3/2003 | Carreras et al. | |
| 7,102,114 B2 | 9/2006 | Graves et al. | |
| 2005/0200984 A1 * | 9/2005 | Browne et al. ............... | 359/846 |

OTHER PUBLICATIONS

Laird, P. et al.; "Applications of Magnetically Shaped Liquid Optical Surfaces"; Applications of Photonic Technology 5; Proceedings of SPIE, vol. 4833 (2002); pp. 451-457.
Moretto, G. et al.; "Aplanatic Corrector Designs for the Extremely Large Telescope"; Optical Society of America; Applied Optics; vol. 39, No. 16, Jun. 1, 2000; pp. 2805-2812.
Stamper, B. et al.; "Flat Membrane Mirrors for Space Telescopes"; International Society for Optical Engineering; 1999; 11 pgs.
Divoux, C. et al.; Deformable Mirror Using Magnetic Membranes: Application to Adaptive Optics in Astrophysics; IEEE Transactions on Magnetics; vol. 34, No. 5; Sep. 1998; pp. 3564-3567.

* cited by examiner

*Primary Examiner* — Jennifer L. Doak
(74) *Attorney, Agent, or Firm* — Guerin & Rodriguez, LLP

(57) ABSTRACT

Described is a magnetic membrane mirror having a flexible membrane comprising a magnetic material and having a high reflectance. The flexible membrane is secured over a frame to enclose a volume between the frame and membrane. A transmembrane pressure is established to achieve a desired mirror shape or curvature. Curvature can be changed by modifying the transmembrane pressure by increasing or decreasing the pressure in the enclosed volume. An array of electromagnetic actuators generates individually-controlled magnetic fields to cause localized displacements of the mirror surface. The magnetic membrane mirror can be constructed with inexpensive components and can be used as a dynamic component in an adaptive optical system.

6 Claims, 5 Drawing Sheets

MAGNETIC MEMBRANE MIRROR

RELATED APPLICATION

This application claims the benefit of the earlier filing date of U.S. Provisional Patent Application Ser. No. 60/799,452, filed May 11, 2006, titled "Magnetic-Membrane Mirror," the entirety of which is incorporated herein by reference.

GOVERNMENT RIGHTS IN THE INVENTION

This invention was made with government support under grant number FA8721-05-C-0002 awarded by the Air Force. The government has certain rights in this invention.

FIELD OF THE INVENTION

The present invention relates generally to deformable mirrors. More particularly, the invention relates to a magnetic membrane mirror having a mirror surface shape controlled by a transmembrane pressure and electromagnetic actuators.

BACKGROUND OF THE INVENTION

High-resolution imaging of celestial objects through the atmosphere and the interstellar medium requires that the wavefront distortion caused by these media be removed before the light from the object reaches the imaging sensor. Distortion caused by a time-varying, inhomogeneous medium can be removed with one or more active optical components. In a typical configuration, light from a bright star near the target object is collected by a telescope, collimated, reflected by a flat deformable mirror, and passed through a lenslet array which produces a pattern of bright spots on an imaging CCD array. Any distortion in the light from the star causes image spots on the imaging array to shift in a characteristic way, allowing a computer receiving data from the CCD array to determine the necessary changes to the wavefront to restore it to the original shape before distortion. To accomplish the wavefront correction, the computer sends commands to an array of actuators that push or pull on a deformable mirror so that the distorted mirror surface compensates for the distortion in the received wavefront. The wavefront from the bright star is repeatedly analyzed and, in response, the shape of the deformable mirror is repeatedly adjusted. An imaging sensor images the full field-of-view of the telescope during a long exposure which may include multiple updates to the mirror surface. Under favorable conditions, a high-performance adaptive-optics system equipped with a deformable mirror can significantly improve the resolution of a ground-based telescope so that images of distant objects are resolved at resolutions similar to those achievable for imaging outside the atmosphere, such as for an on-orbit telescope system.

The design and fabrication of flexible mirrors remains one of the greatest challenges in the field of astronomical-telescope engineering, due in large part to the conflict between the rigidity necessary for the mirror to hold a precise optical surface and the flexibility required to perform wavefront correction. Deformable mirrors such as those used in high-performance adaptive-optics systems of major observatories are difficult to fabricate and expensive. Deformable mirrors typically are small. Moreover, difficulties associated with fabricating curved deformable mirrors generally means that adaptive-optics systems use a flat deformable mirror as an additional optical component in the optical path of a static imaging system. The additional optical surface of the deformable mirror increases the scattered light and absorptive light-loss, resulting in a decrease in the system throughput and contrast. In addition, the full telescope aperture is mapped onto the smaller aperture of the deformable mirror, effectively decreasing the transverse coherence length. Individual actuators must be spaced more closely as the size of the deformable mirror decreases to maintain the resolution of the wavefront correction, while the actuator stroke must continue to meet or exceed the required correction amplitude. The stiffness of deformable mirrors made from solid substrates limits the actuator density-stroke product, making the fabrication of mirrors with large strokes and high actuator densities challenging.

What is needed is a deformable mirror that overcomes the problems described above. The present invention satisfies this need and provides additional advantages.

SUMMARY OF THE INVENTION

In one aspect, the invention features a magnetic membrane mirror that includes a reflective flexible membrane and a frame. The reflective flexible membrane comprises a magnetic material. The frame has a mounting surface and an opening. The reflective flexible membrane is secured over the mounting surface to define an enclosed volume between the frame and the reflective flexible membrane. The opening in the frame is adapted for pressure control of the enclosed volume, wherein the shape of a surface of the reflective flexible membrane is determine according to a transmembrane pressure.

In another aspect, the invention features a method for adjusting a mirror surface of a magnetic membrane mirror having a reflective flexible membrane comprised of a magnetic material. A transmembrane pressure is generated to shape a surface of the reflective flexible membrane. A magnetic field is adjusted at a local region of the reflective flexible membrane to modify the shape of the surface of the reflective flexible membrane.

In another aspect, the invention features a method for fabricating a magnetic membrane mirror. A sealant is applied to a frame having a mounting surface. A substantially uniform tension is applied to a flexible reflective membrane disposed in part on the mounting surface of the frame. The sealant seals an enclosed volume defined between the frame and the reflective flexible membrane. The reflective flexible membrane is monitored to determine a shape irregularity and the tension is adjusted in response to the determined shape irregularity.

In still another aspect, the invention features an optical system that includes a magnetic membrane mirror, a wavefront sensor and an actuator control module. The magnetic membrane mirror includes a reflective flexible membrane comprising a magnetic material, a frame having a mounting surface and an opening, and a plurality of electromagnetic actuators. The reflective flexible membrane is secured over the mounting surface to define an enclosed volume between the frame and the reflective flexible membrane. The opening in the frame is adapted for pressure control of the enclosed volume, wherein the shape of a surface of the reflective flexible membrane is determine according to a transmembrane pressure. The electromagnetic actuators are positioned proximate to the flexible membrane. Each electromagnetic actuator is configured to locally deform the surface of the reflective flexible membrane in response to a respective actuator control signal. The wavefront sensor determines a wavefront of received light. The actuator control module is in communication with the magnetic membrane mirror and the wavefront sensor. The actuator control module controls the electromagnetic actuators to dynamically deform the surface in response to wavefront data generated by the wavefront sensor.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a magnetic membrane mirror having a flexible membrane comprising a magnetic material and having a high reflectance. The flexible membrane is secured over a frame to enclose a volume between the frame and membrane. A transmembrane pressure is established to achieve a desired mirror shape or curvature. The curvature can be changed by modifying the transmembrane pressure, for example, by increasing or decreasing the pressure in the enclosed volume. An array of electromagnetic actuators generates individually-controlled magnetic fields to cause localized displacements of the mirror surface. The magnetic membrane mirror can be constructed with inexpensive components and can be used as a dynamic component in an adaptive optical system. For example, the magnetic membrane mirror can be employed as the primary mirror in a telescope system employing dynamic correction for atmospheric turbulence.

Figure 1A:
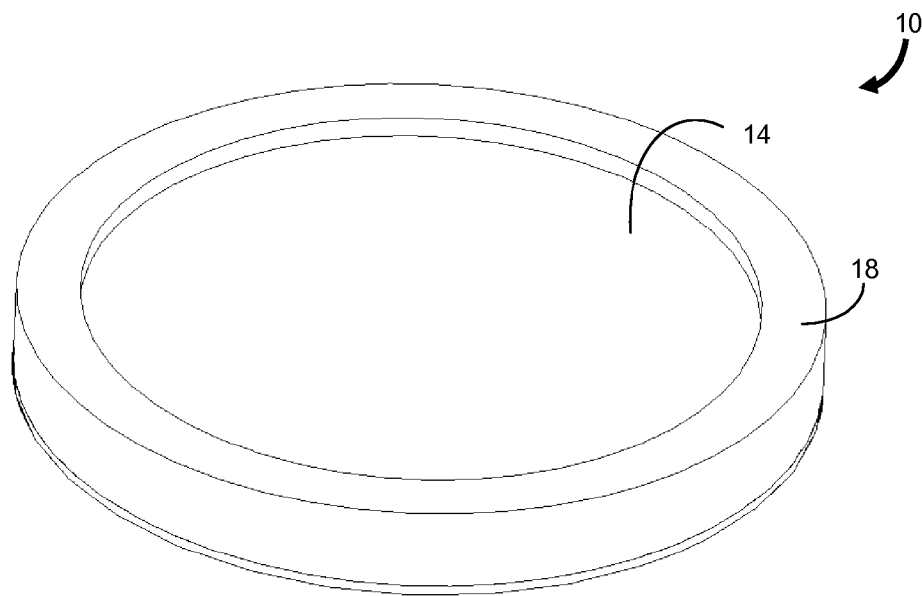
FIG. 1A and FIG. 1B show a perspective view and a partial cut-away view, respectively, of a magnetic membrane mirror according to an embodiment of the invention.
Figure 1B:
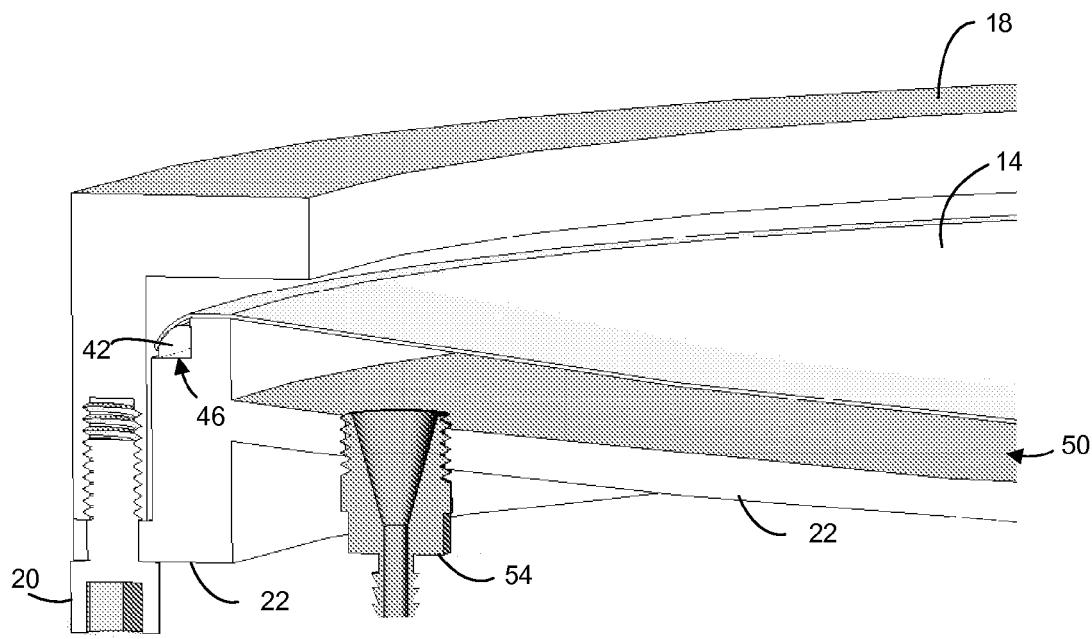

FIG. 1A shows a perspective view of a magnetic membrane mirror 10 constructed according to principles of the invention. The mirror 10 includes a flexible membrane 14 stretched across an open end of a frame (not visible) and secured in place in part by a retaining ring 18. FIG. 1B illustrates a partial cut-away view of the mirror 10 of FIG. 1A showing the membrane 14, retaining ring 18 and frame 22.

Figure 2A:
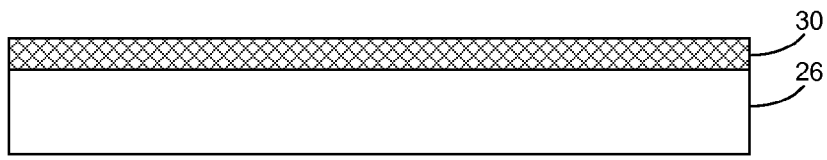
FIG. 2A through FIG. 2E show membranes of the magnetic membrane mirror fabricated according to different techniques.
Figure 2B:
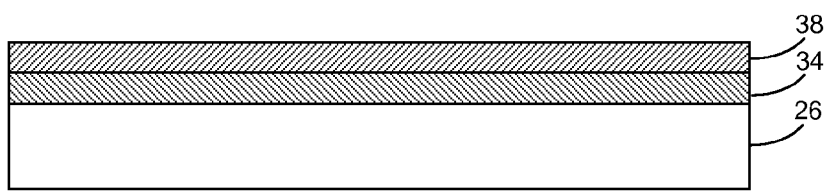
Figure 2C:
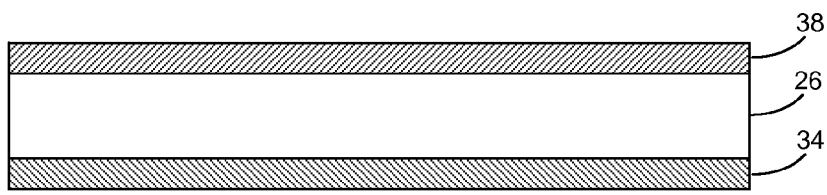
Figure 2D:
Figure 2E:
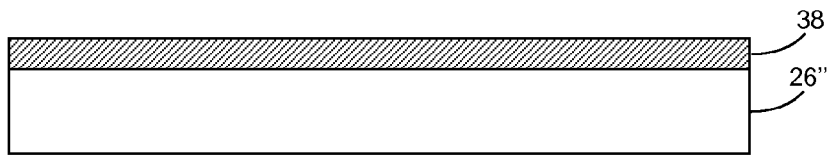

The membrane 14 can be fabricated from a polymer such as polyethylene terephthalate (PET) that can be drawn into a thin film with a high tensile strength and uniform thickness. Referring to FIG. 2A, a membrane can be formed by coating a surface of a film 26 with a magnetic and reflective material 30 using a vacuum sputtering technique or other coating process. In one embodiment, the membrane includes a PET film coated with an alloy of cobalt, zirconium and niobium available as Atalante® from Bekaert Advanced Coatings N.V. (Belgium). The Atalante® film has a high magnetic permeability and saturation magnetization, a high reflectance for visible wavelengths and a low surface roughness to reduce scattered light. In other embodiments the film 26 and coating are configured differently. For example, a magnetic coating 34 can be applied to one side of the film 26 and then a reflective coating 38 is deposited onto the magnetic coating 34 as shown in FIG. 2B. The type of reflective coating 38 is determined according to the particular application. For example, for visible and near infrared (IR) optical systems aluminum can be the preferred material, especially for low cost applications. Alternatively, a gold coating can be used for a greater reflectance across the visible and near IR spectrum. A multi-layer interference coating can be used for certain applications such as optical systems designed for discrete wavelengths. FIG. 2C shows another film configuration in which a reflective coating 38 and a magnetic coating 34 are applied to opposite sides of the film 26. FIG. 2D shows a film 26' fabricated from a material having a high reflectance at the wavelengths of interest. In this embodiment only a magnetic coating 34 is applied. FIG. 2E shows a film 26" that has a high magnetic permeability and saturation magnetization. Consequently, a reflective coating 38 is applied and a magnetic coating is not necessary.

Referring again to FIG. 1A and FIG. 1B, the frame 22 has the form of a shallow aluminum dish although in other embodiments the frame 22 can be constructed from other non-magnetic materials such as titanium or plastic. The retainer ring 18 is secured to the frame 22 using bolts 20. According to an embodiment of a method for fabricating the magnetic membrane mirror 10, a piece of a polymer film having a diameter substantially larger than the frame 22 is stretched taut and a sealant such as a bead of slow-setting epoxy 42 is applied to a channel 46 on the outside of the aluminum dish 22. A hoop holding the piece of film is placed over the dish 22, then the pressure of the volume 50 enclosed between the film and the dish 22 is reduced through a valve (not shown) coupled to a pressure control fitting 54 on the dish 22 to create an air-tight seal. The film is substantially uniformly tensioned, for example, by securing weights to the edge of the hoop. After allowing time for the epoxy to cure, the weights and hoop are removed and excess film is trimmed from the frame 22. A thin strip of film is left to form a permanent electrical contact with the frame 22 to prevent charge buildup on the surface of the film and a consequential change in the shape of the mirror surface. Preferably, the film is heat treated to locally strain-relieve the film and to improve the figure of the mirror 10.

In an alternative embodiment of a method for fabricating the magnetic membrane mirror 10, many of the fabrication steps described above are automated. Preferably, once the membrane 14 is stretched over the frame 22, the membrane 14 is monitored throughout the remainder of the fabrication process to determine any shape irregularity so that the tension can be adjusted, if necessary. For example, an interferometer or a wavefront sensor can monitor the membrane 14 to see if there is any wavefront error in a beam reflected from the membrane 14. Data or feedback signals are then provided to the tensioning mechanism to make appropriate adjustments in the applied tension to achieve a satisfactory wavefront.

The differential pressure across the membrane 14, i.e., the transmembrane pressure, determines the mirror curvature. As depicted, the pressure in the enclosed volume 50 is less than the external or ambient air pressure, resulting in a concave mirror surface. The transmembrane pressure can be changed to modify the mirror surface. More specifically, air or gas can be added through a valve connected by tubing to the pressure control fitting 54 on the bottom of the dish 22 to make the mirror surface less concave. Conversely, air or gas can be removed from the enclosed volume 50 through the valve to make the mirror surface more concave. In an alternative embodiment, the sign of the transmembrane pressure is reversed. That is, the pressure in the enclosed volume 50 exceeds the external pressure so that the mirror surface is convex. Thus air or gas is added or removed through the valve to make the mirror surface more convex or less convex, respectively.

In one embodiment, the thickness of the membrane 14 is not uniform, resulting in a tension non-uniformity. For example, the thickness can increase or decrease with radial distance from the center of the membrane 14 to the retaining ring 18 to achieve a parabolic mirror surface or other aspherical mirror surface.

Preferably the bottom portion of the aluminum dish 22 is thin (e.g., 10 mm) and the gap between the dish 22 and the membrane 14 is small (e.g., 10 mm) so that the performance of electromagnetic actuators (described below) is improved. In a preferred embodiment the bottom portion of the dish 22 includes pockets to allow the actuators to be positioned closer to the membrane 14 so that smaller actuators and lower power drive signals can be used.

Figure 3:
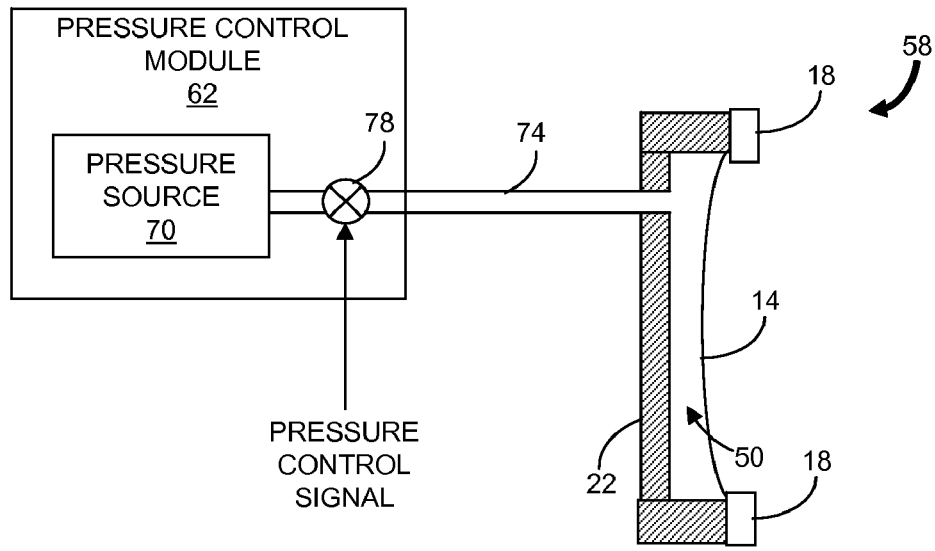
FIG. 3 is a functional block diagram showing a magnetic membrane mirror according to an embodiment of the invention.

FIG. 3 is a functional block diagram showing an embodiment of a magnetic membrane mirror 58 according to the invention. The magnetic membrane mirror 58 includes a frame 22, a reflective flexible magnetic membrane 14, and a pressure control module 62 in communication with an enclosed volume 50 defined between the frame 22 and the membrane 14. The pressure control module 62 includes a pressure source 70 such as an air pump or vacuum pump coupled to a pressure control fitting 54 on the frame 22 by a flexible plastic tube 74. A valve 78 provided along the flexible plastic tube is used to regulate the transmembrane pressure. The valve 78 responds to a pressure control signal to increase or decrease the air or gas pressure in the enclosed volume 50. The pressure control signal can be an error signal that is responsive to small changes in the pressure of the enclosed volume 50 so that the transmembrane pressure is maintained substantially constant and the mirror surface does not change shape over time. Alternatively, the control signal can be responsive to a system command. For example, the magnetic membrane mirror 58 can be an element in an adaptive optical system in which the focal length is desired to be change. In this instance, the pressure in the enclosed volume 50 is intentionally increased or decreased to change the shape of the mirror surface and the effective focal length of the adaptive optical system.

Figure 4:
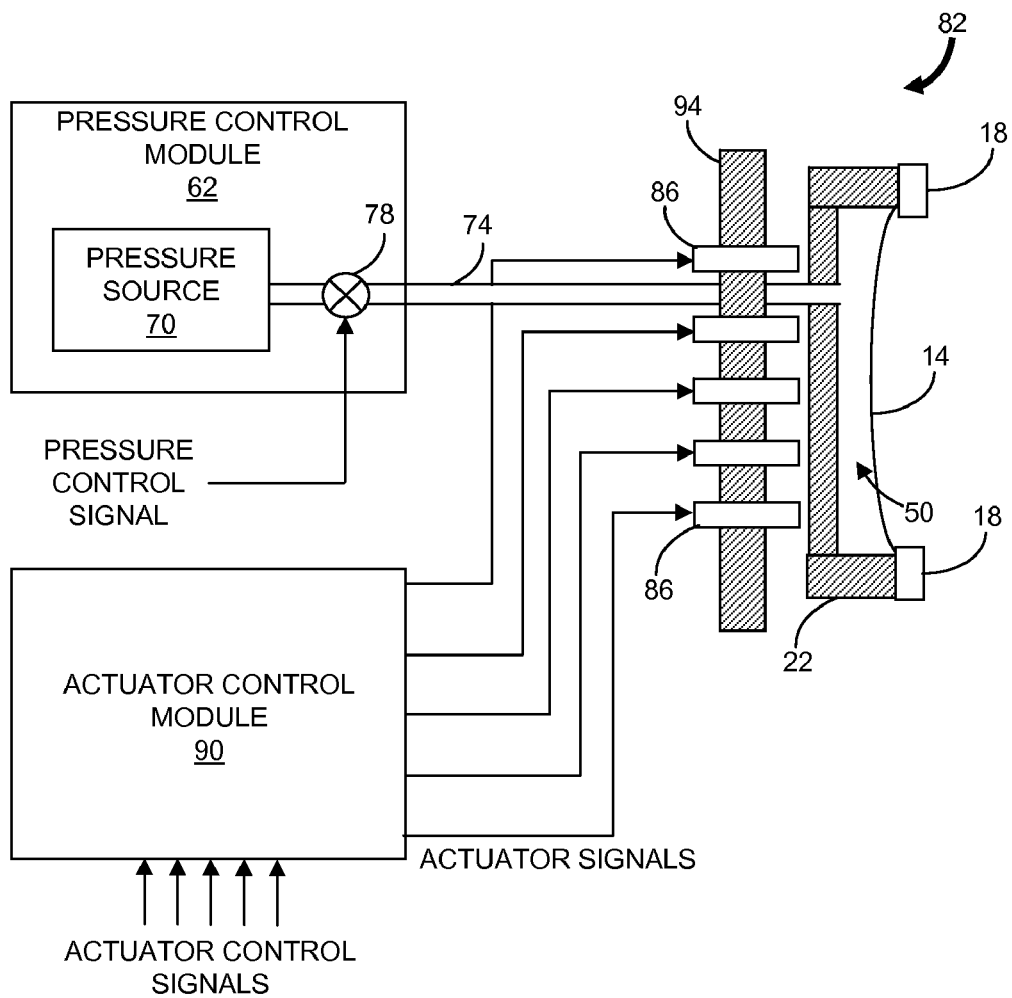
FIG. 4 is a functional block diagram showing a magnetic membrane mirror according to another embodiment of the invention.

FIG. 4 is a functional block diagram showing another embodiment of a magnetic membrane mirror 82 according to the invention. The magnetic membrane mirror 82 includes similar components to the magnetic membrane mirror 58 of FIG. 3 and also includes an array of electromagnetic actuators 86 and an actuator control module 90. The actuators 86 are secured in an aluminum harness 94 and positioned near to the bottom surface of the frame 22. The actuator control module 90 communicates with each actuator 86 such that a magnetic field generated by each actuator 86 is individually controllable and responsive to a respective actuator control signal. In the illustrated embodiment, the received actuator control signals can be analog electrical signals received from a processor or computer as described in more detail below. In a preferred embodiment the actuator control signals are low current analog signals which are amplified by the actuator control module 90 into high current actuator signals capable of driving the actuators 86 to generate sufficiently high magnetic fields to deform the mirror surface.

Figure 5:
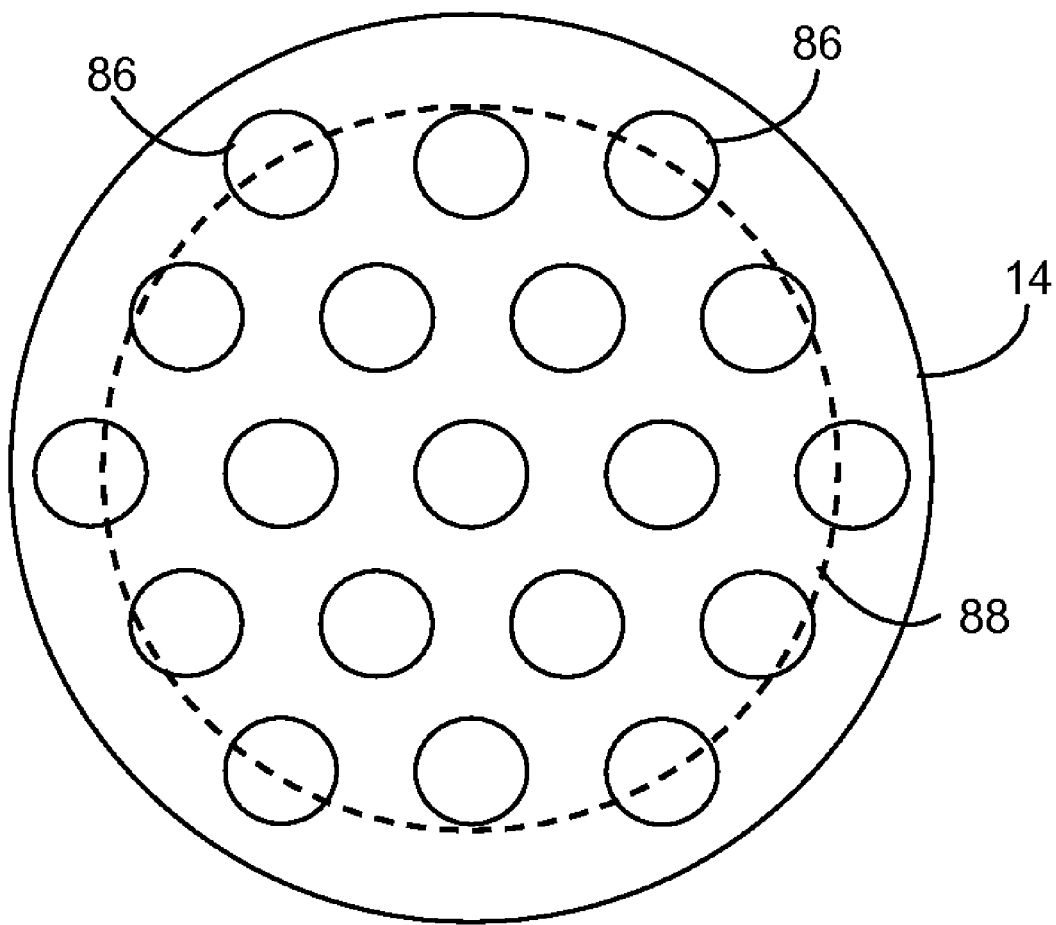
FIG. 5 is a graphical depiction of one example of the spatial relationship of an array of electromagnetic actuators used to deform the mirror surface of a magnetic membrane mirror according to the invention.

FIG. 5 is a graphical representation of an example of the spatial relationship of an array of electromagnetic actuators 86 used to deform the mirror surface of a magnetic membrane mirror. Nineteen actuators 86 are configured in a hexagonal arrangement. The magnetic field generated by an actuator 86 results in a localized force on the membrane 14, causing a localized deformation of the mirror surface. The mirror surface displacements required for an actuator 86 (i.e., the actuator amplitude or "stroke") preferably are limited to a range that is less than the maximum amplitude range for the actuator 86. In some applications, the mirror surface can require adjustment of a few wavelengths or less thus actuator strokes may be on the order of microns. Conversely, demanding applications such as airborne optical systems may require actuator amplitudes of tens of microns or more. In some applications the useful aperture 88 of the magnetic membrane mirror can be limited to a diameter substantially less than the largest separation of diametrically opposite actuators according to wavefront reconstruction algorithms or other system limitations.

Figure 6:
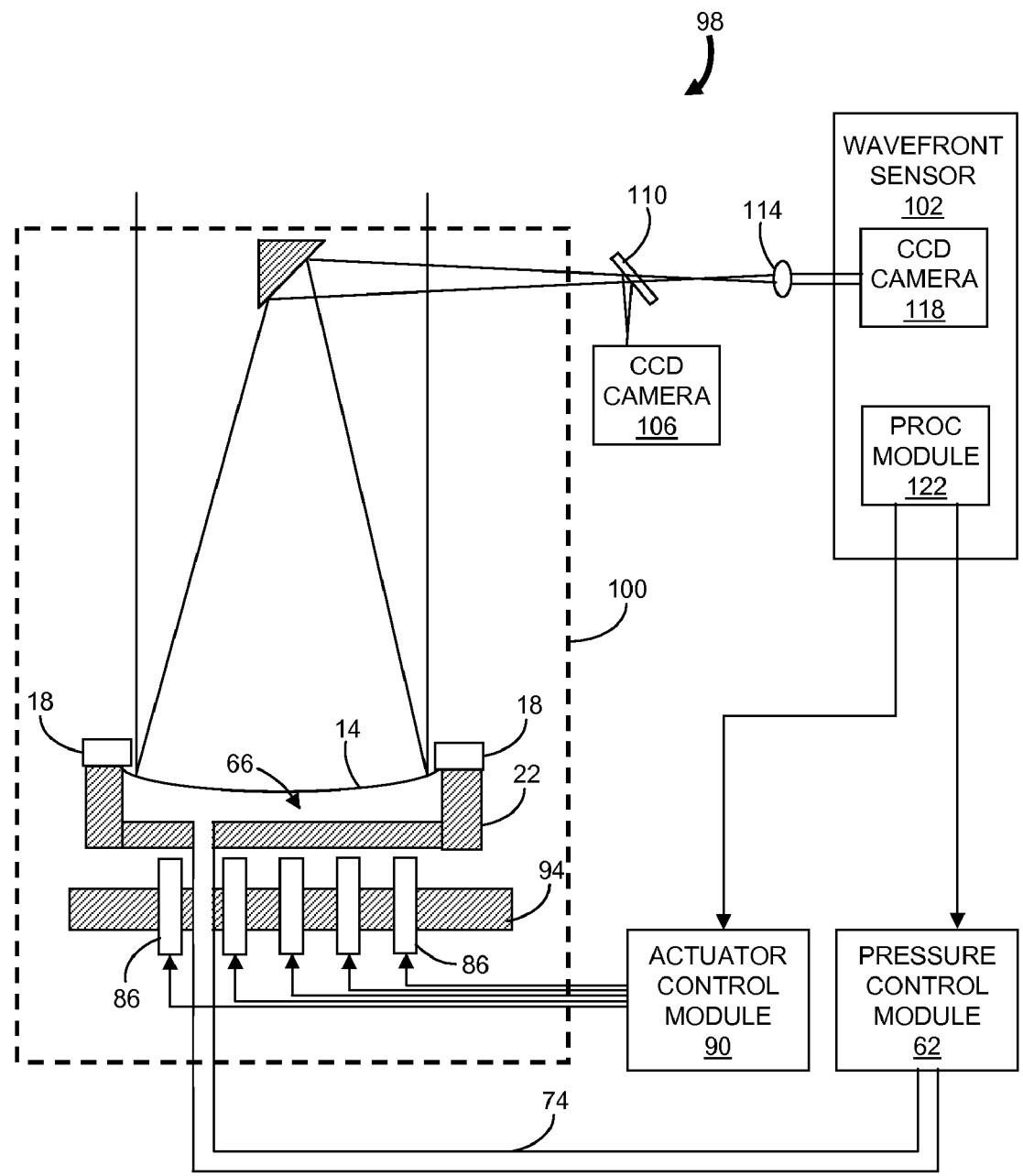
FIG. 6 illustrates an adaptive optical system utilizing a magnetic membrane mirror as a primary mirror according to an embodiment of the invention.

FIG. 6 illustrates an adaptive optical system 98 that includes a Newtonian telescope 100 utilizing a magnetic membrane mirror as a primary mirror, a wavefront sensor 102, a CCD camera 106, a pressure control module 62 and an actuator control module 90. The system 98 also includes a beamsplitter 110 to direct a portion of the image beam to the CCD camera 106 for imaging at the prime focus of the telescope 100. Light passing through the beamsplitter 110 is collimated by an eyepiece 114 and is received by the wavefront sensor 102. In one embodiment the wavefront sensor 102 includes a seventh-order hexagonal microlens array integral with a second CCD camera 118.

The system 98 is used to image objects beyond the atmosphere of the earth. High resolution images obtained with conventional telescope systems without adaptive correction are typically degraded by time-varying inhomogeneities (e.g., turbulence) in the atmosphere. To adaptively correct the wavefront for improved imaging, light from a bright star near the object to be imaged is collected by the telescope 100 and analyzed by the wavefront sensor 102 to determine how to deform the mirror surface to compensate for the atmospheric distortion. The wavefront sensor 102 includes a processing module 122 (e.g., personal computer (PC) or workstation) that analyzes image data from the second CCD camera 118 to determine the current wavefront and required corrections. Control signals are provided to the actuator control module 90 to adjust the power supplied to the respective electromagnetic actuators 86. The mirror surface is deformed in response to the local magnetic fields of the actuators 86 to minimize aberration in the wavefront. Actuator control signals have a bandwidth that matches or exceeds the maximum required update rate for the mirror surface to continuously compensate for atmospheric turbulence. The control signals are determined in part from prior calibration of each actuator 86 to determine its influence on the mirror surface. As illustrated, another control signal provided to the pressure control module 62 adjusts the transmembrane pressure to change the focal length of the Newtonian telescope 100 in response to a detected change in the focus of the telescope 100 or to image an object at a different object distance.

The magnetic membrane mirror can be used as an optical component or module for a variety of other applications. For example, the magnetic membrane mirror can be used in an optical system subject to vibration. Data from one or more vibration sensors are processed to generate appropriate actuator control signals which can be used to compensate for the vibration. Similarly, optical systems having temperature-dependent properties can utilize a magnetic membrane mirror controlled by actuator control signals responsive to temperature data. In another example, the surface of the reflective flexible membrane is controlled to achieve a desired sequence of surface shapes. The sequence is generated by a preprogrammed sequence of actuator control signals, a preprogrammed pressure control signal, or both. Preprogrammed sequences can be used, for example, to steer a beam or to change the focus of a beam over time in a predetermined way. Preprogrammed sequences are particularly useful in manufacturing processes and other environments in which repetitive or routine tasks are required.

While the invention has been shown and described with reference to specific embodiments, it should be understood by those skilled in the art that various changes in form and detail may be made therein without departing from the spirit and scope of the invention.

What is claimed is:

1. An optical system comprising:
   a magnetic membrane mirror comprising:
      a reflective flexible membrane comprising a magnetic material and having a surface with a shape determined according to a transmembrane pressure; and
      a plurality of electromagnetic actuators positioned proximate to the flexible membrane, each electromagnetic actuator configured to locally deform the surface of the reflective flexible membrane in response to a respective actuator control signal;
   a wavefront sensor configured to generate wavefront data indicative of aberration in a wavefront of received light; and
   an actuator control module in communication with the magnetic membrane mirror and the wavefront sensor, the actuator control module controlling each of the electromagnetic actuators to dynamically locally deform the surface in response to the wavefront data generated by the wavefront sensor.

2. The optical system of claim 1 further comprising a pressure control module in electrical communication with the wavefront sensor and in pneumatic communication with the magnetic membrane mirror, the pressure control module controlling the transmembrane pressure to change the shape of the surface in response to wavefront data generated by the wavefront sensor.

3. The optical system of claim 1 wherein the electromagnetic actuators are biased to generate a predetermined shape of the surface of the reflective flexible membrane.

4. The optical system of claim 1 wherein the actuator control module dynamically adjusts the surface of the reflective flexible membrane in response to measured vibration data.

5. The optical system of claim 1 wherein the actuator control module dynamically adjusts the surface of the reflective flexible membrane in response to measured temperature data.

6. The optical system of claim 1 wherein the actuator control module dynamically adjusts the surface of the reflective flexible membrane to generate a preprogrammed sequence of shapes.

* * * * *